US012149313B2

(12) United States Patent
Bohn et al.

(10) Patent No.: US 12,149,313 B2
(45) Date of Patent: Nov. 19, 2024

(54) LOW CONSUMPTION DIGITAL TO ANALOG CONVERSION FOR ANTENNA ARRAYS

(71) Applicant: NOKIA SOLUTIONS AND NETWORKS OY, Espoo (FI)

(72) Inventors: Thomas Bohn, Remseck am Neckar (DE); Dirk Wiegner, Schwaikheim (DE); Eric Wantiez, Le Perray en Yvelines (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/511,165

(22) Filed: Nov. 16, 2023

(65) Prior Publication Data

US 2024/0171235 A1 May 23, 2024

(30) Foreign Application Priority Data

Nov. 17, 2022 (FI) ...................................... 20226029

(51) Int. Cl.
*H04B 7/06* (2006.01)
*H04B 7/08* (2006.01)
*H04W 28/08* (2023.01)

(52) U.S. Cl.
CPC ......... *H04B 7/0608* (2013.01); *H04B 7/0817* (2013.01); *H04W 28/0925* (2020.05)

(58) Field of Classification Search
CPC .. H04B 7/0608; H04B 7/0613; H04B 7/0817; H04W 28/0925
See application file for complete search history.

(56) References Cited

U.S. PATENT DOCUMENTS

| 7,187,314 | B1 | 3/2007 | Beamish et al. |
| 9,509,385 | B2* | 11/2016 | Gustavsson .......... H04B 7/0617 |
| 2012/0146828 | A1 | 6/2012 | Narathong et al. |
| 2015/0365151 | A1 | 12/2015 | Gustavsson |
| 2016/0302146 | A1 | 10/2016 | Rangan et al. |
| 2017/0012679 | A1* | 1/2017 | Gustavsson ............... H03F 1/02 |
| 2019/0163435 | A1* | 5/2019 | Lambert ................. G06F 3/162 |
| 2020/0127673 | A1 | 4/2020 | Zhang et al. |

(Continued)

FOREIGN PATENT DOCUMENTS

WO      2015/188894 A1    12/2015

OTHER PUBLICATIONS

Finnish Office Action and Search Report dated Mar. 31, 2023 corresponding to Finnish Patent Application No. 20226029.

(Continued)

*Primary Examiner* — Alpus Hsu
(74) *Attorney, Agent, or Firm* — SQUIRE PATTON BOGGS (US) LLP

(57) ABSTRACT

Disclosed is a method which includes determining a traffic load situation and determine a category for the traffic load situation. The method also includes determining, based on the traffic load situation, one or more groups of digital to analog converters to be used, wherein the one or more groups have different resolutions for digital to analog conversions. The method may further include activating the determined one or more groups of digital to analog converters for transmitting signals. Additionally, the method may include transmitting the signals using multiple antennas.

10 Claims, 14 Drawing Sheets

(56) References Cited

U.S. PATENT DOCUMENTS

2020/0260376 A1\* 8/2020 Islam ................ H04W 52/0212
2022/0200617 A1 6/2022 Clara et al.

OTHER PUBLICATIONS

Office Action—Communication of Acceptance dated Oct. 2, 2023 corresponding to Finnish Patent Application No. 20226029.
Partial European Search Report dated Apr. 3, 2024 corresponding to European Patent Application No. 23210586.6.
Arkady Molev-Shteiman et al., "New Equivalent Model of a Quantizer with Noisy Input and its Applications for MIMO System Analysis and Design," IEEE Access, IEEE, vol. 8, Sep. 3, 2020, pp. 162601-162624, XP011809112.
Extended European Search Report dated Jun. 24, 2024 corresponding to European Patent Application No. 23210586.6.

\* cited by examiner

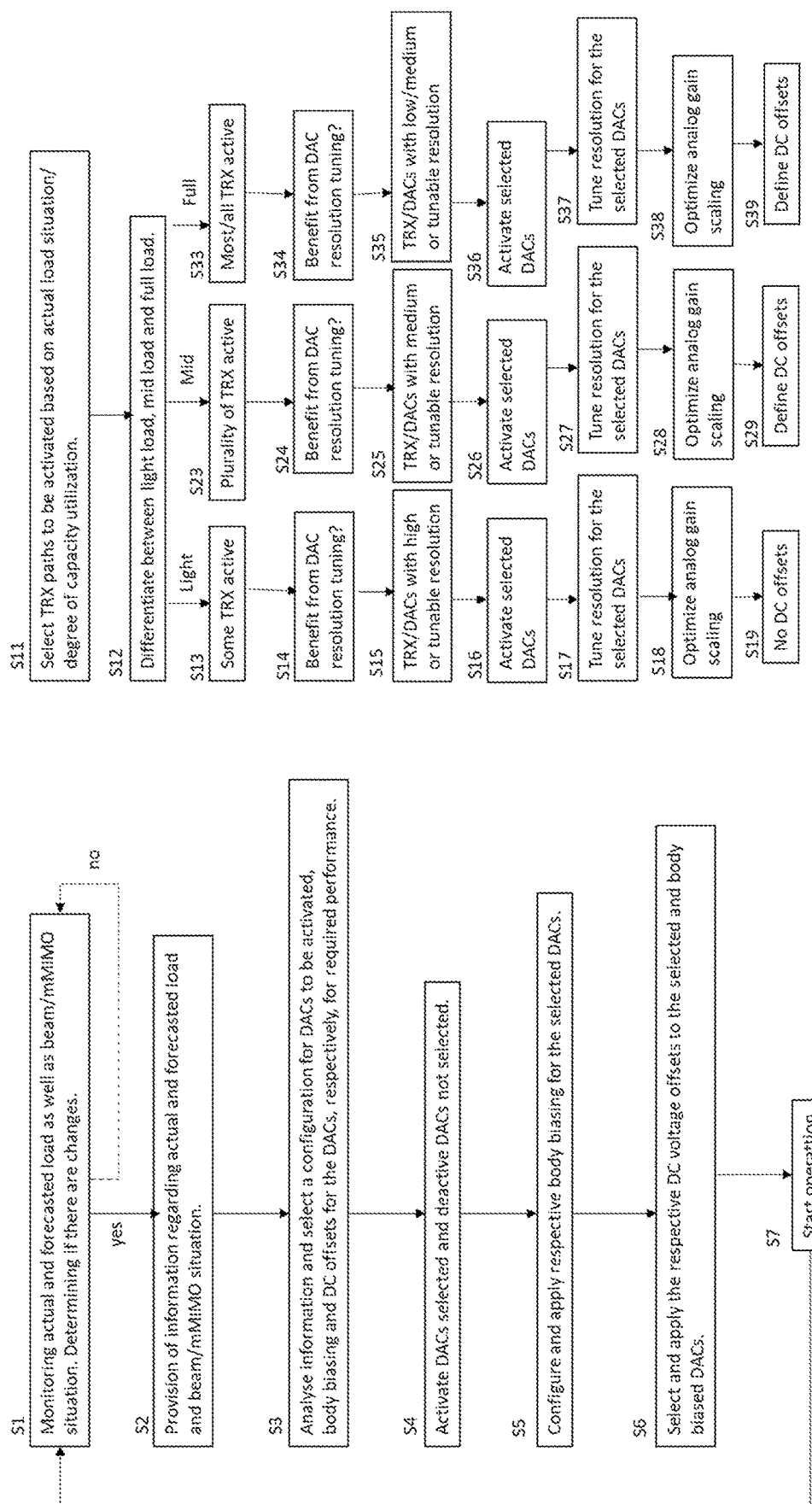

LOW CONSUMPTION DIGITAL TO ANALOG CONVERSION FOR ANTENNA ARRAYS

CROSS REFERENCE TO RELATED APPLICATION

This application claims the benefit of Finnish Patent Application No. 20226029, filed Nov. 17, 2022. The entire content of the above-referenced application is hereby incorporated by reference.

FIELD

The following exemplary embodiments relate to wireless communication and improvements for digital to analog conversion used for antenna arrays.

BACKGROUND

Wireless communication networks, such as cellular communication networks are to support data throughput that has a trend of continuous increase. Multi-antenna systems may be used to support the data throughput required. Techniques such as multiple input, multiple output (MIMO) allow simultaneous operation of multiple transceivers and may benefit from appropriate over-the-air (OTA) superposition of transmitted and respectively received signals in order to achieve spatial multiplexing and thus obtain improved throughput compared to for example systems comprising a single or low number of transceivers.

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is provided an apparatus comprising means for obtaining a plurality of signals for transmission, wherein the signals are digital signals, determining individual values for the plurality of signals, respectively, wherein at least two of the individual values are different from each other, adding the individual values to the plurality of signals, respectively, performing a digital to analog conversion, individually, to the plurality of signals by their respective digital to analog converters, removing, from the plurality of signals, the individual values that were added to the individual signals, and transmitting the plurality of signal using a plurality of antennas.

In some example embodiments according to the first aspect, the means comprises at least one processor, and at least one memory, including a computer program code, wherein the at least one memory and the computer program code are configured, with the at least one processor, to cause the performance of the apparatus.

According to a second aspect there is provided an apparatus comprising at least one processor, and at least one memory including a computer program code, wherein the at least one memory and the computer program code are configured, with the at least one processor, to cause the apparatus to: obtain a plurality of signals for transmission, wherein the signals are digital signals, determine individual values for the plurality of signals, respectively, wherein at least two of the individual values are different from each other, add the individual values to the plurality of signals, respectively, perform a digital to analog conversion, individually, to the plurality of signals by their respective digital to analog converters, remove, from the plurality of signals, the individual values that were added to the individual signals, and transmit the plurality of signal using a plurality of antennas.

According to a third aspect there is provided a method comprising: obtaining a plurality of signals for transmission, wherein the signals are digital signals, determining individual values for the plurality of signals, respectively, wherein at least two of the individual values are different from each other, adding the individual values to the plurality of signals, respectively, performing a digital to analog conversion, individually, to the plurality of signals by their respective digital to analog converters, removing, from the plurality of signals, the individual values that were added to the individual signals, and transmitting the plurality of signal using a plurality of antennas.

In some example embodiments according to the third aspect, the method is a computer-implemented method.

According to a fourth aspect there is provided a computer program comprising instructions for causing an apparatus to perform at least the following: obtain a plurality of signals for transmission, wherein the signals are digital signals, determine individual values for the plurality of signals, respectively, wherein at least two of the individual values are different from each other, add the individual values to the plurality of signals, respectively, perform a digital to analog conversion, individually, to the plurality of signals by their respective digital to analog converters, remove, from the plurality of signals, the individual values that were added to the individual signals, and transmit the plurality of signal using a plurality of antennas.

According to a fifth aspect there is provided a computer program comprising instructions stored thereon for performing at least the following: obtaining a plurality of signals for transmission, wherein the signals are digital signals, determining individual values for the plurality of signals, respectively, wherein at least two of the individual values are different from each other, adding the individual values to the plurality of signals, respectively, performing a digital to analog conversion, individually, to the plurality of signals by their respective digital to analog converters, removing, from the plurality of signals, the individual values that were added to the individual signals, and transmitting the plurality of signal using a plurality of antennas.

According to a sixth aspect there is provided a non-transitory computer readable medium comprising program instructions for causing an apparatus to perform at least the following: obtain a plurality of signals for transmission, wherein the signals are digital signals, determine individual values for the plurality of signals, respectively, wherein at least two of the individual values are different from each other, add the individual values to the plurality of signals, respectively, perform a digital to analog conversion, individually, to the plurality of signals by their respective digital to analog converters, remove, from the plurality of signals, the individual values that were added to the individual signals, and transmit the plurality of signal using a plurality of antennas.

According to a seventh aspect there is provided a non-transitory computer readable medium comprising program instructions stored thereon for performing at least the following: obtaining a plurality of signals for transmission, wherein the signals are digital signals, determining individual values for the plurality of signals, respectively, wherein at least two of the individual values are different from each other, adding the individual values to the plurality of signals, respectively, performing a digital to analog conversion, individually, to the plurality of signals by their respective digital to analog converters, removing, from the plurality of signals, the individual values that were added to the individual signals, and transmitting the plurality of signal using a plurality of antennas.

According to an eighth aspect there is provided a computer readable medium comprising program instructions stored thereon for performing at least the following: obtaining a plurality of signals for transmission, wherein the signals are digital signals, determining individual values for the plurality of signals, respectively, wherein at least two of the individual values are different from each other, adding the individual values to the plurality of signals, respectively, performing a digital to analog conversion, individually, to the plurality of signals by their respective digital to analog converters, removing, from the plurality of signals, the individual values that were added to the individual signals, and transmitting the plurality of signal using a plurality of antennas.

According to a ninth aspect there is provided an apparatus comprising means for determining a traffic load situation and determine a category for the traffic load situation, determining, based on the traffic load situation, one or more groups of digital to analog converters to be used, wherein the one or more groups have different resolutions for digital to analog conversions, activating the determined one or more groups of digital to analog converters for transmitting signals, and transmitting the signals using multiple antennas.

In some example embodiments according to the ninth aspect, the means comprises at least one processor, and at least one memory, including a computer program code, wherein the at least one memory and the computer program code are configured, with the at least one processor, to cause the performance of the apparatus.

According to a tenth aspect there is provided an apparatus comprising at least one processor, and at least one memory including a computer program code, wherein the at least one memory and the computer program code are configured, with the at least one processor, to cause the apparatus to: determine a traffic load situation and determine a category for the traffic load situation, determine, based on the traffic load situation, one or more groups of digital to analog converters to be used, wherein the one or more groups have different resolutions for digital to analog conversions, activate the determined one or more groups of digital to analog converters for transmitting signals, and transmit the signals using multiple antennas.

According to an eleventh aspect there is provided a method comprising: determining a traffic load situation and determine a category for the traffic load situation, determining, based on the traffic load situation, one or more groups of digital to analog converters to be used, wherein the one or more groups have different resolutions for digital to analog conversions, activating the determined one or more groups of digital to analog converters for transmitting signals, and transmitting the signals using multiple antennas.

In some example embodiments according to the eleventh aspect, the method is a computer-implemented method.

According to a twelfth aspect there is provided a computer program comprising instructions for causing an apparatus to perform at least the following: determine a traffic load situation and determine a category for the traffic load situation, determine, based on the traffic load situation, one or more groups of digital to analog converters to be used, wherein the one or more groups have different resolutions for digital to analog conversions, activate the determined one or more groups of digital to analog converters for transmitting signals, and transmit the signals using multiple antennas.

According to a thirteenth aspect there is provided a computer program comprising instructions stored thereon for performing at least the following: determining a traffic load situation and determine a category for the traffic load situation, determining, based on the traffic load situation, one or more groups of digital to analog converters to be used, wherein the one or more groups have different resolutions for digital to analog conversions, activating the determined one or more groups of digital to analog converters for transmitting signals, and transmitting the signals using multiple antennas.

According to a fourteenth aspect there is provided a non-transitory computer readable medium comprising program instructions for causing an apparatus to perform at least the following: determine a traffic load situation and determine a category for the traffic load situation, determine, based on the traffic load situation, one or more groups of digital to analog converters to be used, wherein the one or more groups have different resolutions for digital to analog conversions, activate the determined one or more groups of digital to analog converters for transmitting signals, and transmit the signals using multiple antennas.

According to a fifteenth aspect there is provided a non-transitory computer readable medium comprising program instructions stored thereon for performing at least the following: determining a traffic load situation and determine a category for the traffic load situation, determining, based on the traffic load situation, one or more groups of digital to analog converters to be used, wherein the one or more groups have different resolutions for digital to analog conversions, activating the determined one or more groups of digital to analog converters for transmitting signals, and transmitting the signals using multiple antennas.

According to a sixteenth aspect there is provided a computer readable medium comprising program instructions stored thereon for performing at least the following: determining a traffic load situation and determine a category for the traffic load situation, determining, based on the traffic load situation, one or more groups of digital to analog converters to be used, wherein the one or more groups have different resolutions for digital to analog conversions, activating the determined one or more groups of digital to analog converters for transmitting signals, and transmitting the signals using multiple antennas.

LIST OF DRAWINGS

In the following, the invention will be described in greater detail with reference to the embodiments and the accompanying drawings, in which FIG. 1 illustrates an exemplary embodiment of a radio access network.

FIGS. 11A, 11B and 11C illustrate flow charts according to example embodiments.

DESCRIPTION OF EMBODIMENTS

Figure 1:
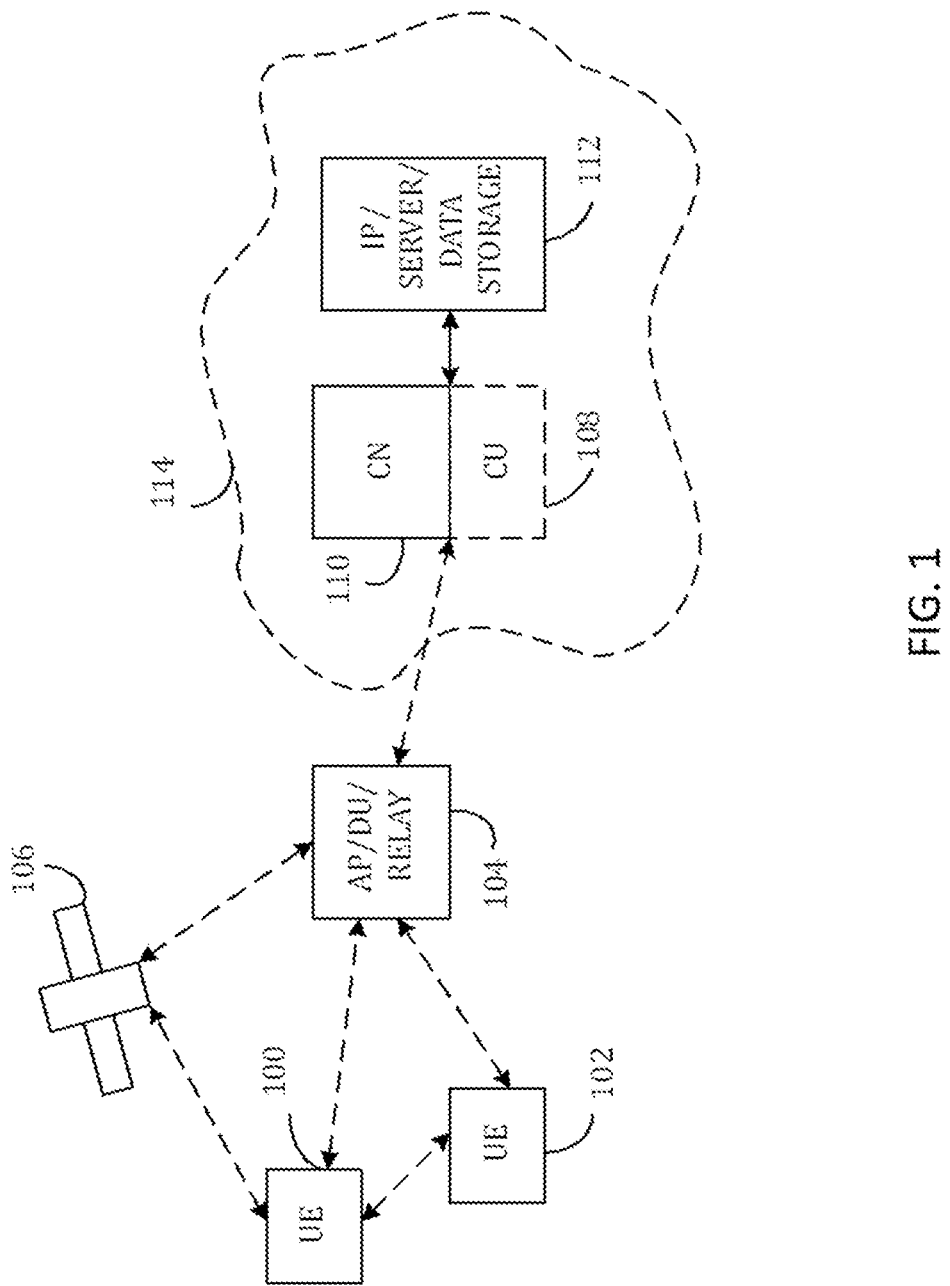

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. The above-described embodiments of the circuitry may also be considered as embodiments that provide means for carrying out the embodiments of the methods or processes described in this document.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via any suitable means. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments described herein may be implemented in a communication system, such as in at least one of the following: Global System for Mobile Communications (GSM) or any other second generation cellular communication system, Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G), as well as 5G-Advanced (i.e. 3GPP NR Rel-18 and beyond), mobile or cellular communication system. Also, the embodiments described herein may be implemented in a 6G communication system as well. The embodiments are not, however, restricted to the system given as an example but a person skilled in the art may apply the solution to other communication systems provided with necessary properties.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may comprise also other functions and structures than those shown in FIG. 1. The example of FIG. 1 shows a part of an exemplifying radio access network.

FIG. 1 shows terminal devices 100 and 102 configured to be in a wireless connection on one or more communication channels in a cell with an access node (such as (e/g)NodeB) 104 providing the cell. The access node 104 may also be referred to as a node. The wireless link from a terminal device to a (e/g)NodeB is called uplink or reverse link and the wireless link from the (e/g)NodeB to the terminal device is called downlink or forward link. It should be appreciated that (e/g)NodeBs or their functionalities may be implemented by using any node, host, server or access point etc. entity suitable for such a usage. It is to be noted that although one cell is discussed in this exemplary embodiment, for the sake of simplicity of explanation, multiple cells may be provided by one access node in some exemplary embodiments.

A communication system may comprise more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The (e/g)NodeB may also be referred to as a base station, an access point or any other type of interfacing device operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side may be a serving gateway (S-GW, routing and forwarding user data packets), packet data network gateway (P-GW, for providing connectivity of terminal devices (UEs) to external packet data networks, user plane function (UPF) for packet routing and forwarding, packet inspection, quality of service (QOS) handling, and external protocol data unit (PDU) session for interconnecting Data Network (DN), in a 5G architecture, access and mobility management function (AMF) for handling connection and mobility management tasks, session management function (SMF) for interacting with a decoupled data plane, creating updating and removing PDU sessions and managing session context with the UPF, or mobile management entity (MME), etc.

The terminal device (also called UE, user equipment, user terminal, user device, etc.) illustrates one type of an apparatus to which resources on the air interface are allocated and assigned, and thus any feature described herein with a terminal device may be implemented with a corresponding apparatus, such as a relay node. An example of such a relay node is a layer 3 relay (self-backhauling relay) towards the base station. Another example of such a relay node is a layer 2 relay. Such a relay node may contain a terminal device part and a Distributed Unit (DU) part. A CU (centralized unit) may coordinate the DU operation via F1AP-interface for example.

The terminal device may refer to a portable computing device that includes wireless mobile communication devices operating with or without a subscriber identification module (SIM), or an embedded SIM, eSIM, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be an exclusive or a nearly exclusive uplink only device, of which an example is a camera or video camera loading images or video clips to a network. A terminal device may also be a device having capability to operate in Internet of Things (IoT) network which is a scenario in which objects are provided with the ability to transfer data over a network without requiring human-to-human or human-to-computer interaction. The terminal device may also utilise cloud. In some applications, a terminal device may comprise a small portable device with radio parts (such as a watch, earphones or eyeglasses) and the computation is carried out in the cloud. The terminal device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications such as (massive) machine-type communications (mMTC), including vehicular safety, different sensors and real-time control. 5G is expected to have multiple radio interfaces, namely below 6 GHZ, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G may require bringing the content close to the radio which may lead to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, and/or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology that may be used includes for example Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling or service availability in areas that do not have terrestrial coverage. Satellite communication may utilise geostationary earth orbit (GEO) satellite systems, but also low earth orbit (LEO) satellite systems, for example, mega-constellations. A satellite 106 comprised in a constellation may carry a gNB, or at least part of the gNB, that create on-ground cells. Alternatively, a satellite 106 may be used to relay signals of one or more cells to the Earth. The on-ground cells may be created through an on-ground relay node 104 or by a gNB located on-ground or in a satellite or part of the gNB may be on a satellite, the DU for example, and part of the gNB may be on the ground, the CU for example. Additionally, or alternatively, high-altitude platform station, HAPS, systems may be utilized.

It is to be noted that the depicted system is an example of a part of a radio access system and the system may comprise a plurality of (e/g)NodeBs, the terminal device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In some exemplary embodiments, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. A network which is able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network may aggregate traffic from a large number of HNBs back to a core network.

When using techniques such as (massive) MIMO, there may be a single chip, in terms of hardware (HW), that is used to implement a transmitter array for the MIMO. The HW for implementing such arrays requires high system integration as for example field programmable gate arrays (FPGAs) or an application specific integrated circuit (ASIC) with multiple integrated digital to analog converters (DACs) and analog to digital converters (ADCs), the so-called radio frequency system on chips (RFSoCs). Development of single chip embedding both digital front end (DFE) and mixed signal (DAC/ADC) may be costly and mixed signal resources are to be sized according to converter quantization as energy consumption may increase exponentially with the resolution. RFSoCs size is limited by Joule effect to cool down according to the cascaded thermal resistance (die to package and package to PCB) that directly affect the Mean Time Before Failure (MTBF) and the critical path. According to Arrhenius equation, an increase by 10° ° C. in temperature reduces component life by half. Thus, it may be beneficial if DAC & ADC resolution may be reduced without harming the over-the-air (OTA) signal quality. For example, it is beneficial if for a given bandwidth (BW) capability of the DAC & ADC, complexity and power consumption is decreased. Furthermore, reduced mixed signal resolutions may be exploited by increasing their BW capabilities which may be desirable for increasing BW demands. Multi-antenna systems TRX with reduced performance and thus lower complexity and lower cost could be used while still maintaining high total multi-antenna system performance thanks to OTA combining effect, taking advantage of signal and quantification noise specific relation properties. This may lead to less design effort and cost for current 5G as well as for future 6G multi-antenna systems or could be used to further improve performance (e.g. throughput).

Figure 2:
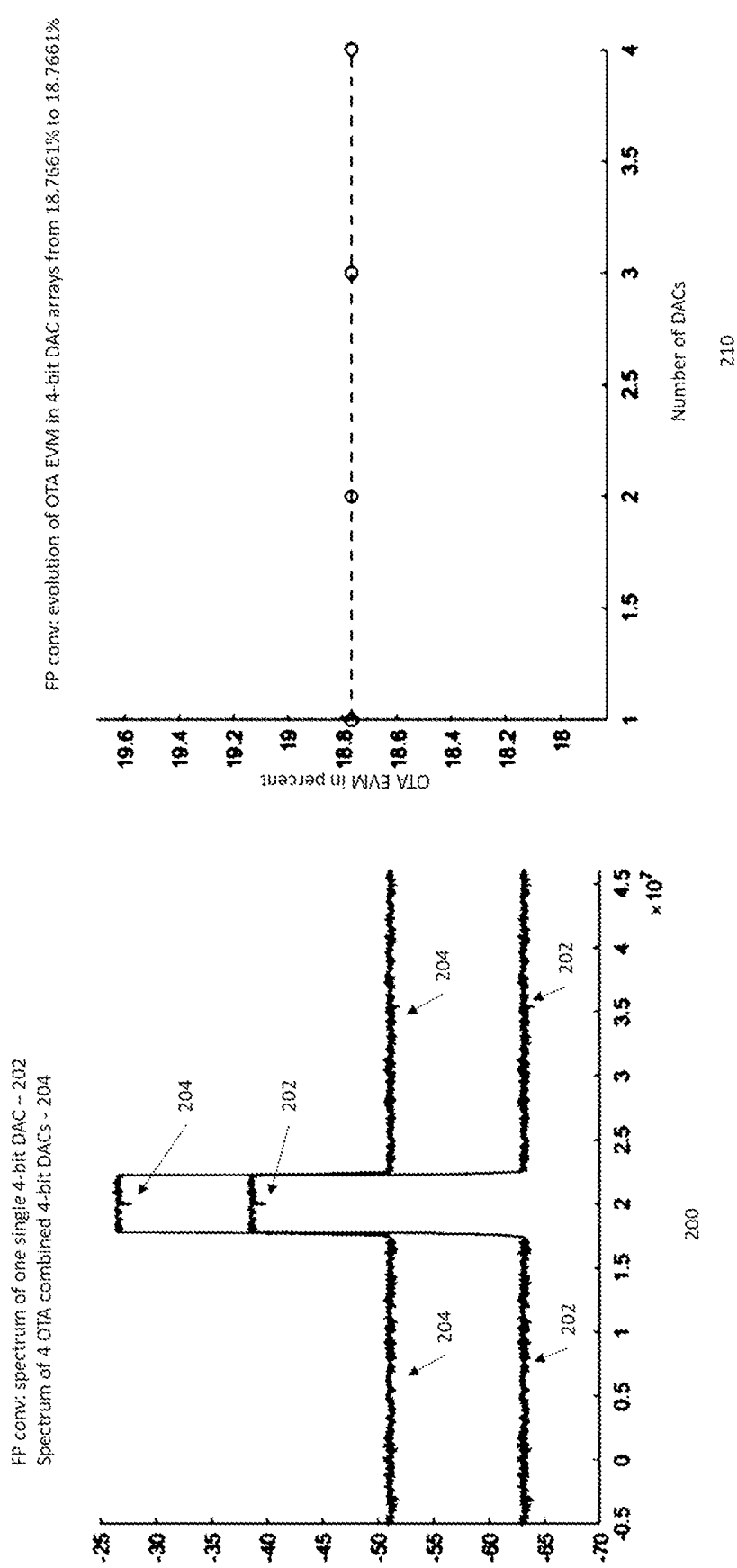
FIG. 2 and FIG. 3 illustrate example graphs regarding example outputs of digital to analog converter.

SoCs for transmitter arrays may comprise the transmitter digital signal processing and the DAC/ADCs as well as their power supply, resulting in very similar quantisation steps for all transmitters of the array. To illustrate in-band signal distortion in such SoCs, error vector magnitude (EVM) may be used. The contribution to the signal distortion of DAC resolutions of 14 to 16 bit may be neglectable. Decreasing the number of bits in the DACs may result in an increased EVM and a decreased signal-to-noise ratio (SNR) due to the quantisation. Both EVM and SNR, resulting from quantisation, may not differ in an individual transmitter given the same input signal. Thus, the sum (the constructive superposition of the analogue signals) is showing the similar EVM for respective SNR values as one of the branches. FIG. 2 illustrates a graph 200 that illustrates an output spectrum of four combined 4-bit identical DACs i.e., showing the transfer function and graph 210 that illustrates their combined EVM in arrays of the up to four 4-bit DACs. In FIG. 2, there is illustrated using the graphs 200 and 210 the DAC output when the quantisation effect as such is modelled. Thus, the difference to an additive white Gaussian noise (AWGN) model if one DAC is present is minimal, but the difference is noticeable when multiple DAC output signals are combined. In graph 200 the line 202 illustrates a floating point (FP) conversion for a spectrum of one single 4-bit DAC and the line 204 illustrates the spectrum of 4 OTA combined 4-bit DACs.

Figure 3:
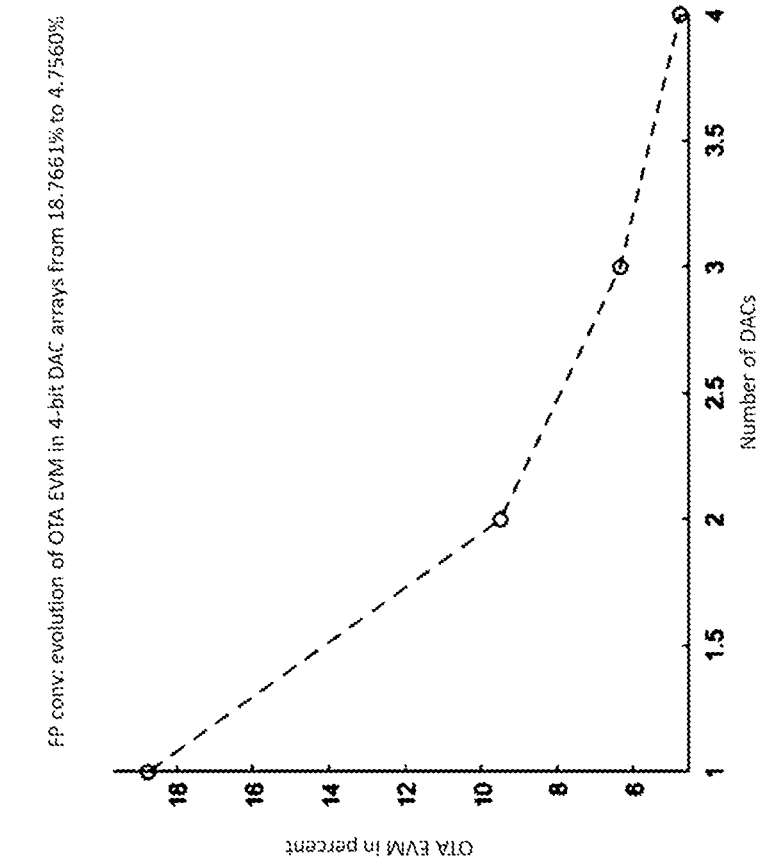
Figure 3:
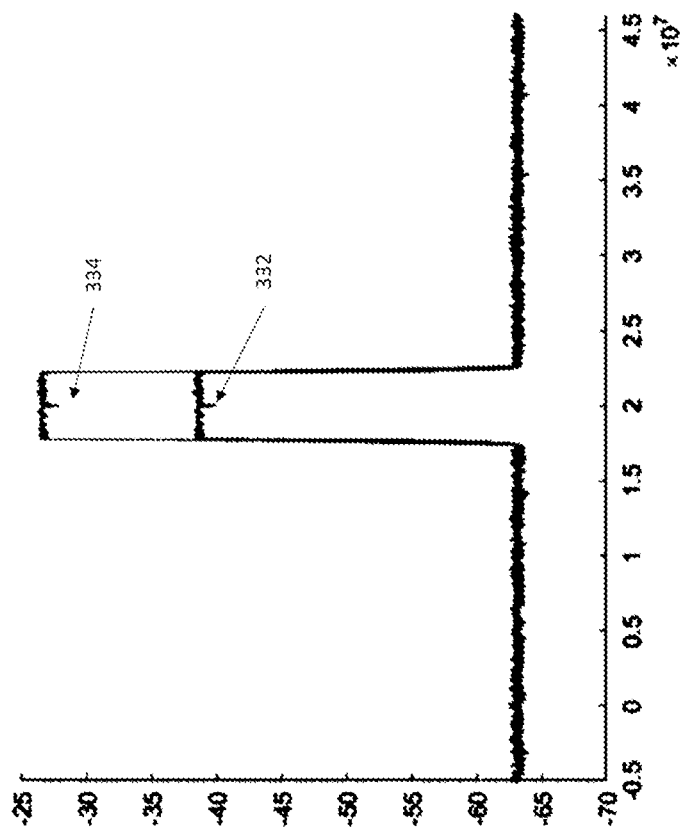

Constant EVM according to number of combined DACs is the sign of high correlation for both signal & quantification noise. A controlled jitter will affect this relationship. Different distinct offsets of the input signals of different DACs in digital domain may be used and the offsets may then be afterwards removed from the analogue signals after the DACs. This may improve the combined OTA signal quality. Improved output spectrum, in other words higher SNR, of four combined 4-bit DACs is illustrated in FIG. 3 in graph 330 and their respective EVM is illustrated in graph 340, when the approach of controlling the DACs in an array with different direct current (DC) offsets is used. In graph 330 the line 332 illustrates an FP conversion for a spectrum of one single 4-bit DAC and the line 334 illustrates the spectrum of 4 OTA combined 4-bit DACs.

Figure 4:
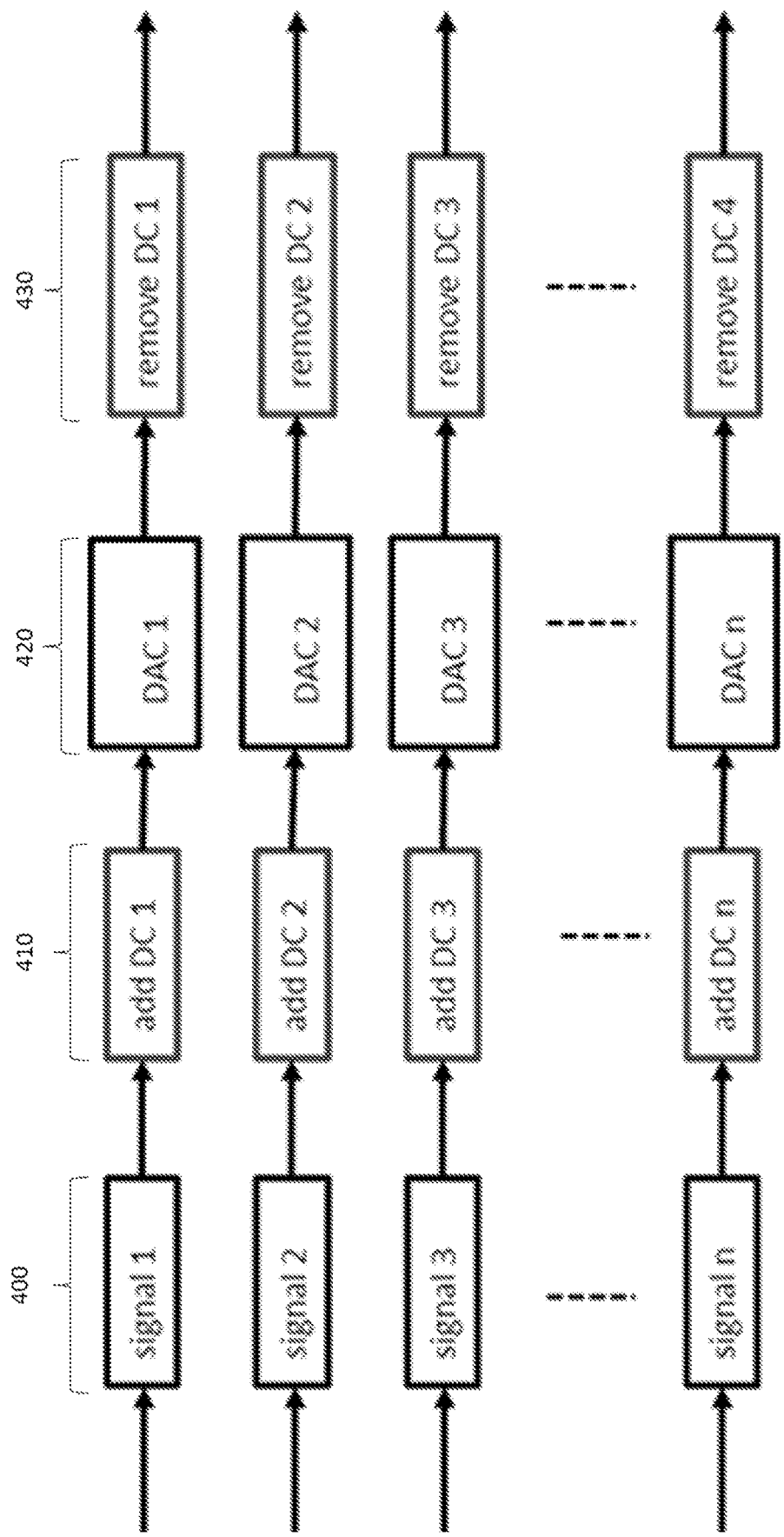
FIG. 4 illustrates an example embodiment of adding values to signals, that are in the digital format, before conversions to analog format.

In a high-resolution digital signal processing domain, in front of the respective DAC, for at least one of the 4 TX, a different DC offset may be added to oversampled baseband (BB) signals before the DACs and the respectively added DC offsets may be removed after the DAC in analogue domain. This approach is illustrated in FIG. 4. It is to be noted though that a DC offset may be understood as a value, that may be a constant value, that is added to the signal when the signal is in a digital format, in other words, before the signal is converted to an analog format. The value may be an individual value with respect to the signal such that it differs from at least another value, that may also be a constant value, that is added to another signal, which is in a digital format, and which is then subsequently converted to an analog format. The added values are then transferred to voltage/current by the DAC. It is further to be noted that the individual values may be constant values at least for the time of one ongoing transmission from start to end. In the example embodiment of FIG. 4, for individual input signals 400, which may be DC free, a DC offset 410 may be added such that the DC offset is different for each of the different input signals 400. Then, the DAC 420 is performed for each input signal, after which the DC offset 410 that was added before the DAC 420, may be removed from the respective signal 430. It is to be noted that as the signals are converted to analog format, the removing of the DC offset from its respective signal may be understood as removing a physical representation of the individual value that was added to the signal when it was in a digital format. Thus, for each signal processing chain, there are steps of obtaining the input signal 400, adding a DC offset 410, that is different from other DC offsets, performing DAC 420, and then removing 430 the added DC offset. As, at least in some example embodiments, the digital BB signals are DC-free signals, in the sense DC signal is used just for gain and offset DAC calibration, a non-quantified DC removal after the DACs is sufficient as illustrated in this example embodiment. The DC offsets 410 that are added to the input signals, in other words to the individual TX paths, various distributions of the offset may be applied to obtain DC offsets 410 that are different for each path, in other words, individual to each signal. For example, the offsets may be equally spaced or randomly defined. The selection may be determined for example based on targeted operation such as line-of-sight beamforming, none line-of sight or line-of-sight massive MIMO, number of instantaneous beams at the time, near or cell edge traffic and/or the number of TX paths involved.

To obtain individual DC offsets for each TX path, existing HW may be utilized. For example, DAC may suffer from DC offset and gain error affecting the linearity response and the scaling. To correct the gain and to add or subtract an offset using a correction circuit an input signal may be registered to an input register. After the input register, a gain may be obtained to the signal and after that, an offset is applied and then the calibrated signal is registered to a register. An algorithm based on multi-iterative may be implemented in a digital signal processor (DSP) or a look-up table method addressing the registers part of the DAC silicon may be utilized. It is also to be noticed that a DC blocker may be part of transmitter designs and may be used to enable individual biasing of active components in the analogue RF line-up. Thus, the existing HW circuitry with component & digital register control may be utilized and their functions may be extended such that the individual DC offsets may be applied to the TX paths, respectively.

Figure 5:
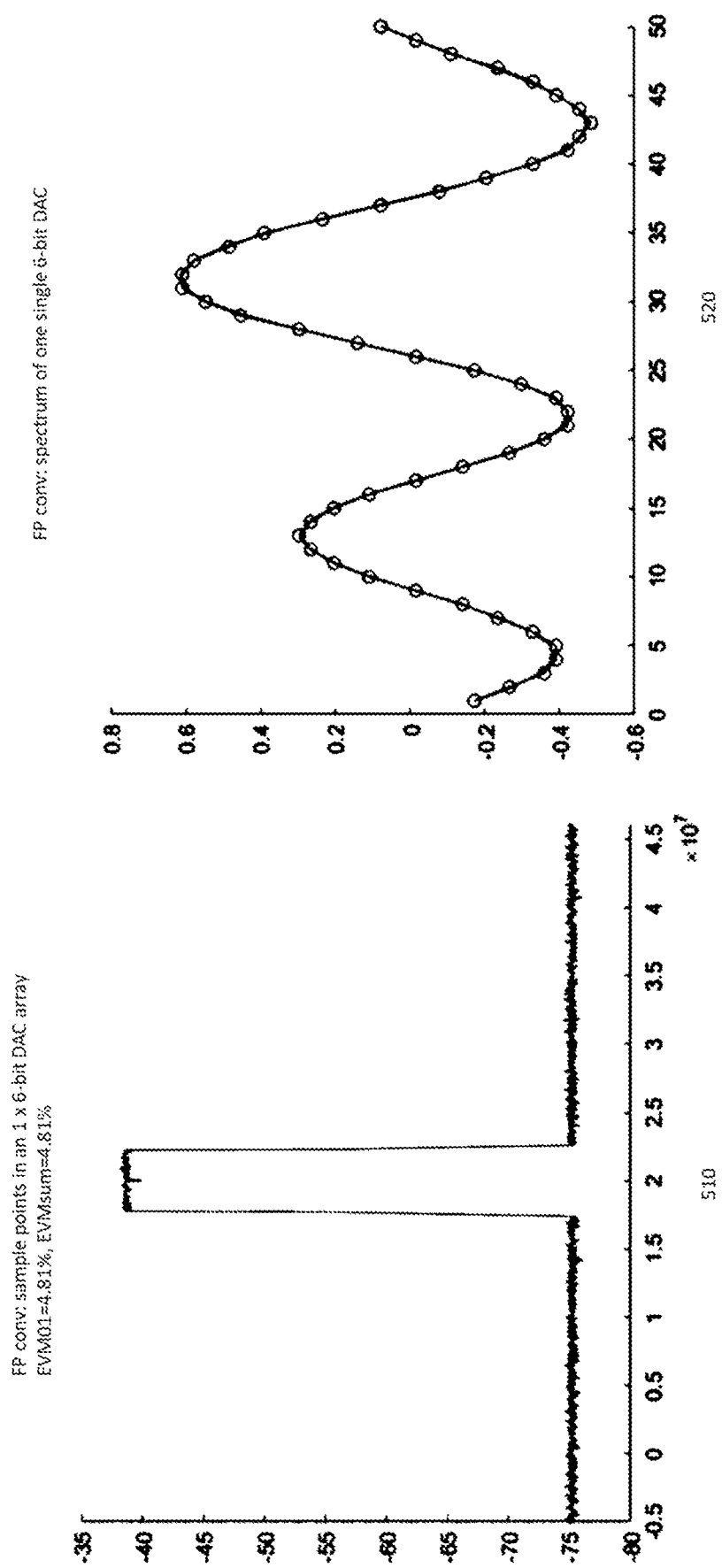
FIG. 5 illustrates example graphs regarding example outputs of digital to analog converter.

In an example embodiment, the DC offsets of 4 4-bit DACs differ by ¼ of the DAC's resolution. With this, each DAC output shows different quantisation steps. As a result, the quantisation steps in the analogue signals differ from each other related to the digital offset given. The sum of the analogue signals therewith appears to come from a DAC with higher DAC resolution, resulting in lower EVM and a higher SNR compared to the output of one single branch using 4-bit DAC. In other words, the quantisation noise of the different DACs become highly uncorrelated and is not summing up when e.g. OTA combining the signals at the user what is usually done for beamforming or massive MIMO systems. For example, when applied to a 4 TX array with 4-bit DACs this approach results in the OTA signal quality of a conventional 6-bit DAC architecture. Mathematically, this may be expressed as "OTA-resolution"[bits] ="DACresolution"+log 2(number−TX) [bits]. FIG. 5 provides graphical illustrations of a single TX path when 6-bit DAC is used. As can be seen, the graph 510 that illustrates an output spectrum of the conventionally operated 6-bit DAC. Graph 520 of FIG. 5 illustrates a quantasized output signal of a 6-bit DAC. As can be seen, when comparing the graph 520 to the line 334 of the graph 330, the outputs are comparable and thus, by having individual offsets applied for lower resolution TX paths, the output may still be comparable to a resolution that is higher than what was used.

Figure 6:
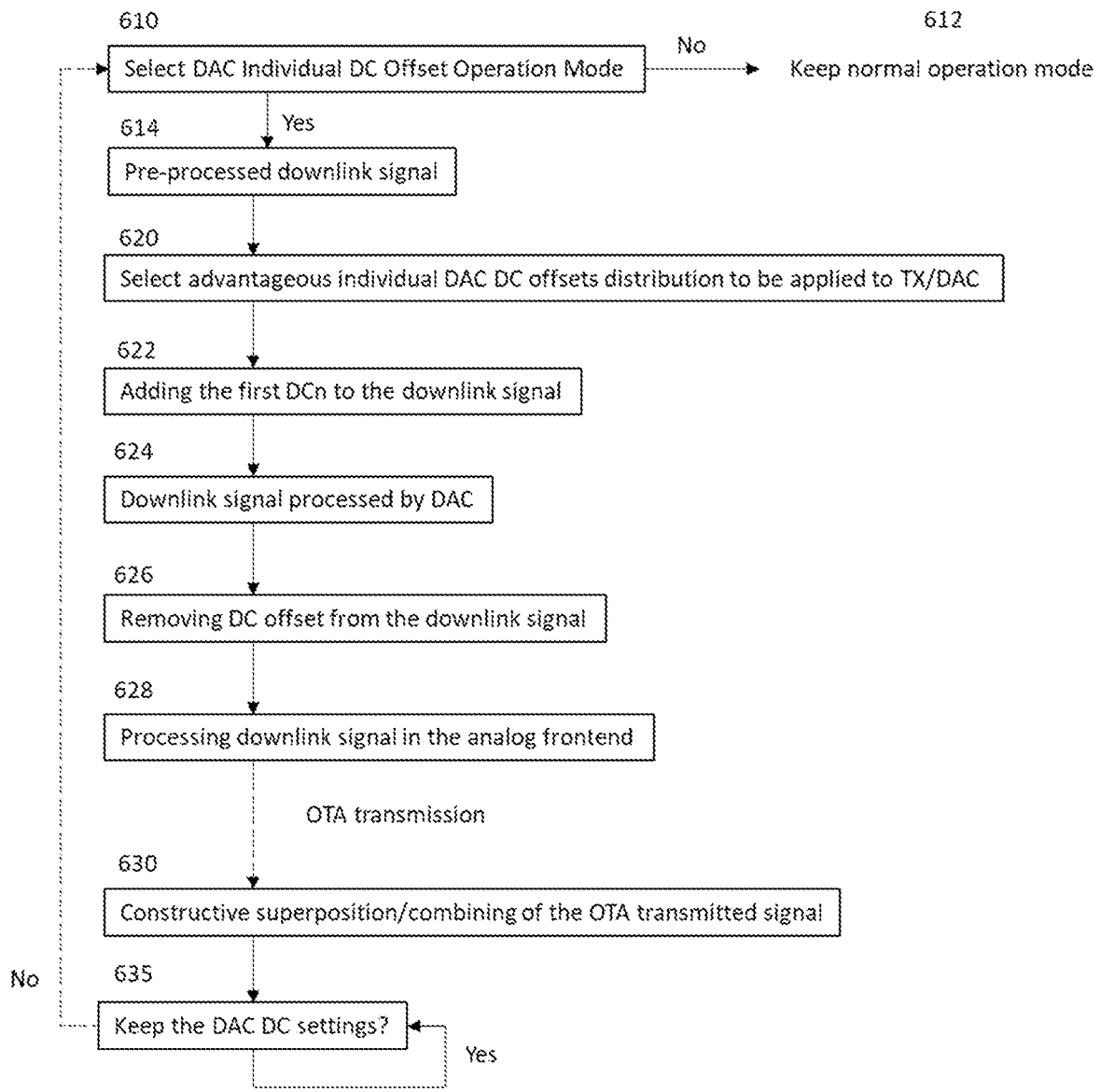
FIG. 6 illustrates a flow chart according to an example embodiment.

FIG. 6 illustrates a flow chart according to an example embodiment. In this example embodiment, downlink streams are operated by adding individual DC offsets to them before a DAC and after the DAC, removing the individual DC offset that was added. This example embodiment is applicable to multi-antenna systems in which the number TX paths is more than one. In other words, there are multiple TX paths. For example, multi-antenna systems at sub-6 GHZ, mm-wave and even up to sub-THz and THz frequency range and/or beamforming and massive MIMO systems, as well as to multi-antenna systems used in open radio access network (ORAN).

First, in block 610, the operation mode is selected to be such that individual DC offsets before DAC for each TX path is applied. If this operation mode is not selected, then, the flow chart proceeds to 612, in which a normal operation mode without individual DC offsets is used. Yet, in this example embodiment, the operation mode is selected such that the individual DC offsets are applied to the different TX paths. Thus, in block 614 downlink signals DLSn, that are to be transmitted, and which may be downlink signals DLSn that are to be pre-processed and which may be downlink signals DLSn without DC offsets, are obtained. Next, in block 620 a DC offset distribution to be applied individually to each signal before DAC is determined. The DC offset distribution may be for example one with equal steps, randomly distributed or any other suitable distribution. Then in block 622 the individual DC offsets are applied to their respective input signals and after that in block 624 the DAC is performed for the input signals. Next, in block 626, after the DAC, the individually added DC offsets are removed from their respective signals. Next, in block 628, the downlink signals are processed by the analog RF frontend after which the OTA transmission is performed. In block 630, the OTA transmitted downlink signals are combined or constructively superpositioned resulting in an improved SNR at the receiver that may be comprised in a terminal device for example. Then, in 635 it is determined if the selected DC offsets are to be kept or re-selected. In case those are to be reselected, then the process goes back to the block 610.

Figure 7A:
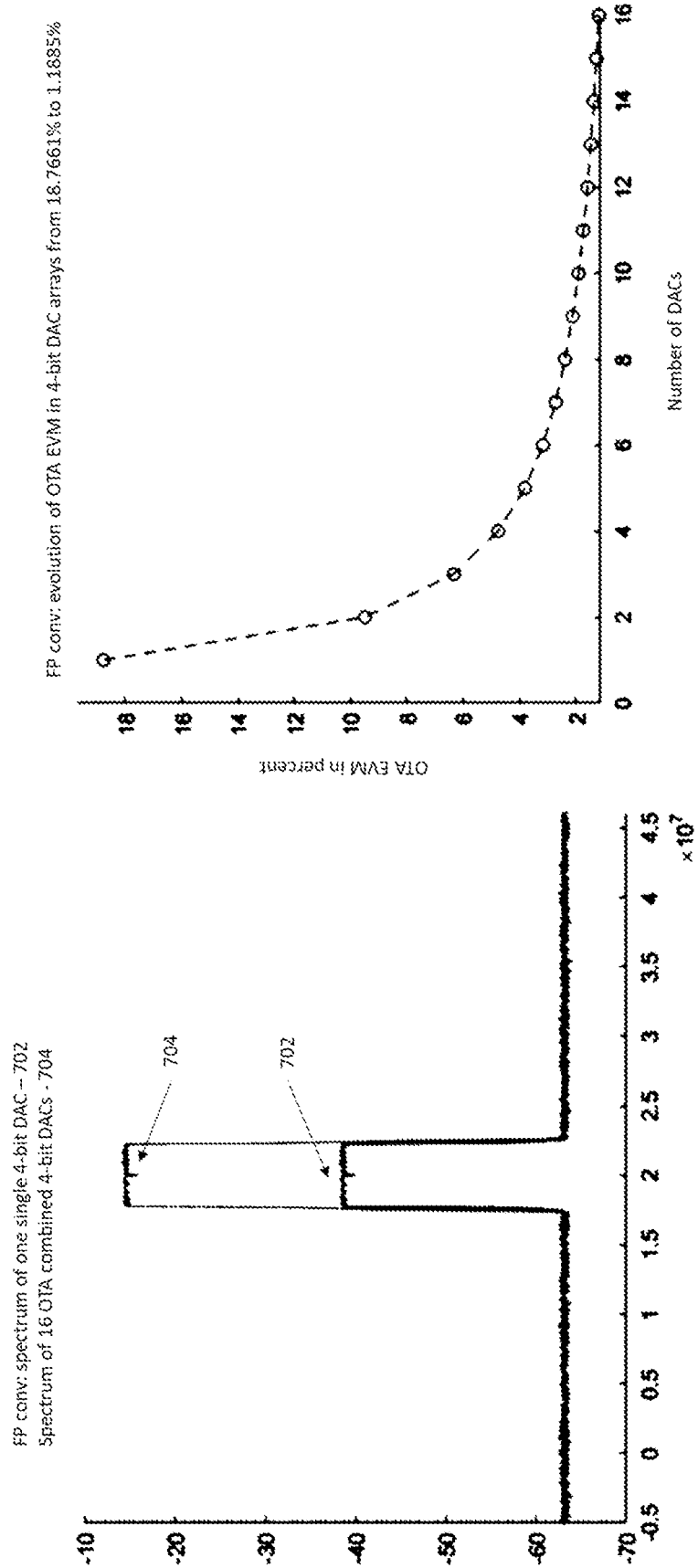
FIGS. 7A and 7B illustrate example graphs regarding example outputs of digital to analog converter.
Figure 7B:
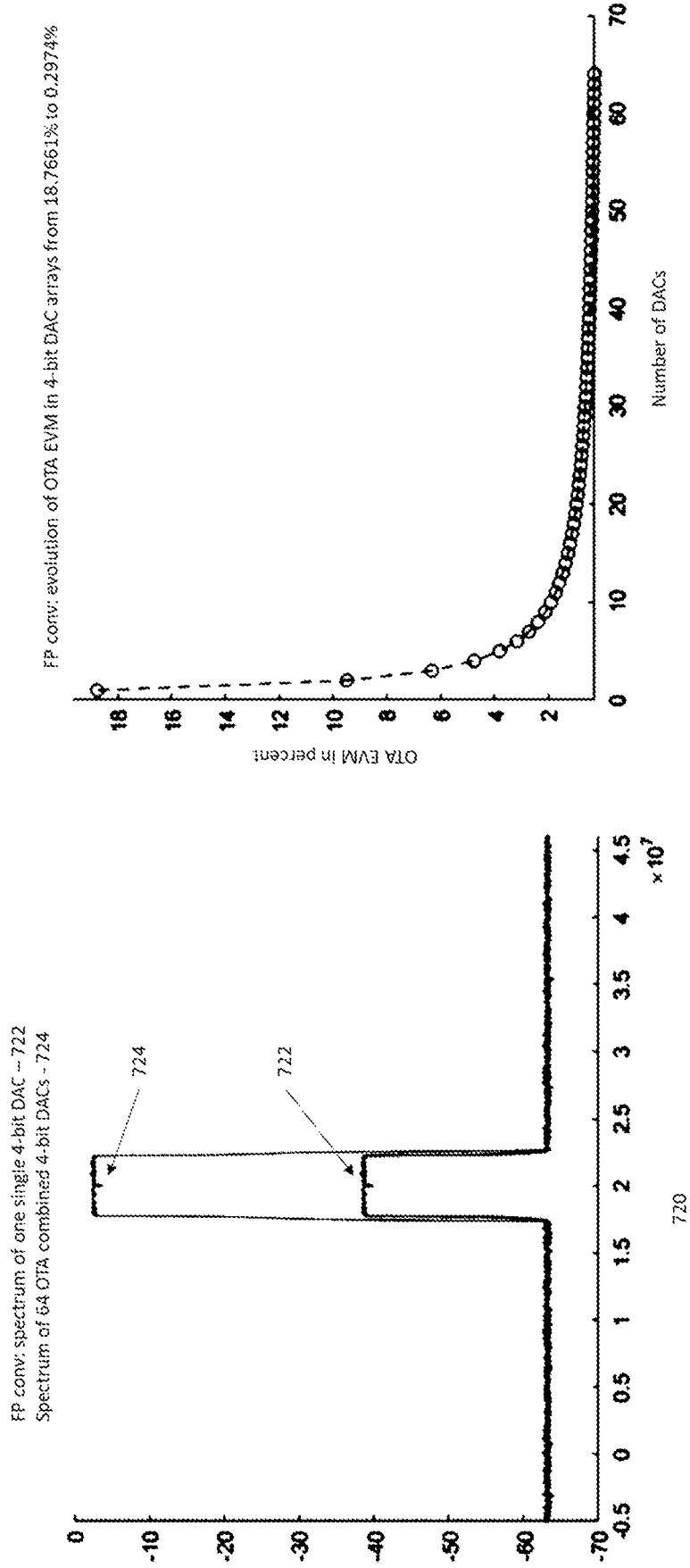

FIG. 7A illustrates graphs 700 and 710 for illustrating output spectrum of sixteen combined 4-bit DACs and their combined EVM in arrays resembling the one of one 14-bit DACs. In graph 700 the line 702 illustrates an FP conversion for a spectrum of one single 4-bit DAC and the line 704 illustrates the spectrum of 16 OTA combined 4-bit DACs. FIG. 7B illustrates graphs 720 and 730 for illustrating output spectrum of 64 combined 4-bit DACs and combined EVM in arrays of up to 64 4-bit DACs. In graph 720 the line 722 illustrates an FP conversion for a spectrum of one single 4-bit DAC and the line 724 illustrates the spectrum of 64 OTA combined 4-bit DACs. The graphs 700, 710, 720 and 730 illustrate how the effect of the individual DC offsets added grows with the number of TX paths.

To address the complexity of RFSOC chips, one approach is to use low resolution converters down to 2 or 3 bits, which may be at the cost of digital resolution enhancer (DRE) in DSP to recover signal to noise and distortion ratio (SINAD) and effective number of bits (ENOB). Such an approach may help to better balance the resources and power consumption either in digital or analog domain to help implementation. Yet it may not meet the target considering Digital Front End (DFE) where both mixed signal (DAC/ADC as analog domain border) and digital processing are in the same chip. As an alternative approach, operation of DACs with different resolution in a dynamic manner according to real time use of operation may be used and that may help to reduce power consumption and improve densification of multi-TRX-antenna systems.

As described above, DACs with lower resolution may be implemented in a multi-antenna system while still obtaining good performance. This may be achieved by applying the individual DC offsets to the individual DACs contributing to an over-the-air combined beam. This approach may be developed further by using a dynamic DAC and also ADC including quantization optimization in multi-TRx-antenna systems, to reduce power consumption and improve integration capability in RFSoC, while still meeting performance requirements for all load situations. A Multi-TRX-Antenna Array which may be hardware populated with the above-described DAC/ADCs capable of dynamic adaptation of numbers of bits (i.e. 4, 8, 14) per resolution may thus be used and such a system may comprise at least a set of DAC/ADCs, for example, either a single group or multi groups, either with DAC/ADCs with fixed resolution, in other words a first type of DAC/ADCs, and also DAC/ADCs with selectable resolutions, in other words a second type of DAC/ADCs. The DAC/ADCs with fixed resolution, may have low resolution with thus reduced complexity, reduced power consumption and reduced cost while the selectable DAC/ADCs group may have a more complex circuit while being able to provide selectable SNR behavior in certain load conditions. It is to be noted that when discussing load, load may be understood to cover aspects including signal strength, a number of simultaneously addressed beams and a number of physical resource blocks (PRBs). For example, a low load may be understood as load to just one beam, or low load but several beams are used, full load as full load but one beam or full load and maximum number of beams. The number of groups as well as the number of DAC/ADCs per group is e.g. a design parameter and may be related to for example the addressed application such as beamforming system or mMIMO, expected maximum number of TRx chain i.e. DAC/ADC controlled in baseband, number of beams simultaneously activated/deactivated, etc. The benefit of equipping a system heterogeneously with selectable and not selectable DAC/ADCs of different resolution may be to reduce power consumption due to increased flexibility of usage and to offer higher level of integration compared to systems being fully equipped with high and fixed resolution DACs. Thus, the operation of a heterogeneously resolution selectable DAC/ADCs equipped multi-TRX-antenna-array may be modified to address e.g. different load situations thereby targeting on improved overall system efficiency versus load i.e. according to number of beams at the time and/or radio blocks to transmit and receive. Further, by using a heterogeneously resolution selectable DAC/ADC equipped multi-TRX-antenna array, flexible creation and/or configuration of sub-arrays, comprising resolution tunable DAC/ADCs also with different resolution and with optionally different DC offsets may be obtained.

In mMIMO, a mMIMO machine with 64 TRx chain may be able to transmit 64 beams at the time in theory. In practice, the number of supported beams may be for example a maximum of 16 beams at a time, which may be called as a full load use case, defining the size of the machine with digital and analog components. Full load may be assumed to be for example a situation in which there are maximum number of PRBs and all beams used. But this use case may be met during just a few hours over a 24 h time period. An average cell load may be for example <30% half of the time. As RF transmitted power is directly proportional to load and assuming power amplifier efficiency drop with back-off, this means the system may not be operated with the highest possible energy efficiency while 100% load condition defined silicon size according to Peak to Average Ratio (PAR), and the tolerated distortion of the signal to transmit defined by the modulation scheme.

As discussed above, in case of multi-antenna systems with multiple layers, the DAC resolution may be reduced when applying different DC offsets to the individual TRX paths/DACs/antennas which may in fact lead to reduced performance (EVM, SNR) of the individual paths, but when doing e.g. over-the-air combining a good performance may be achieved again with improved e.g. EVM and SNR compared to the individual contributing paths. Thus, multi-TRX antenna systems may be populated with DACs of selectable or a set of selectable and non-selectable resolution. Further, except DC offset, the approach discussed above is applicable to ADC as well.

Figure 8:
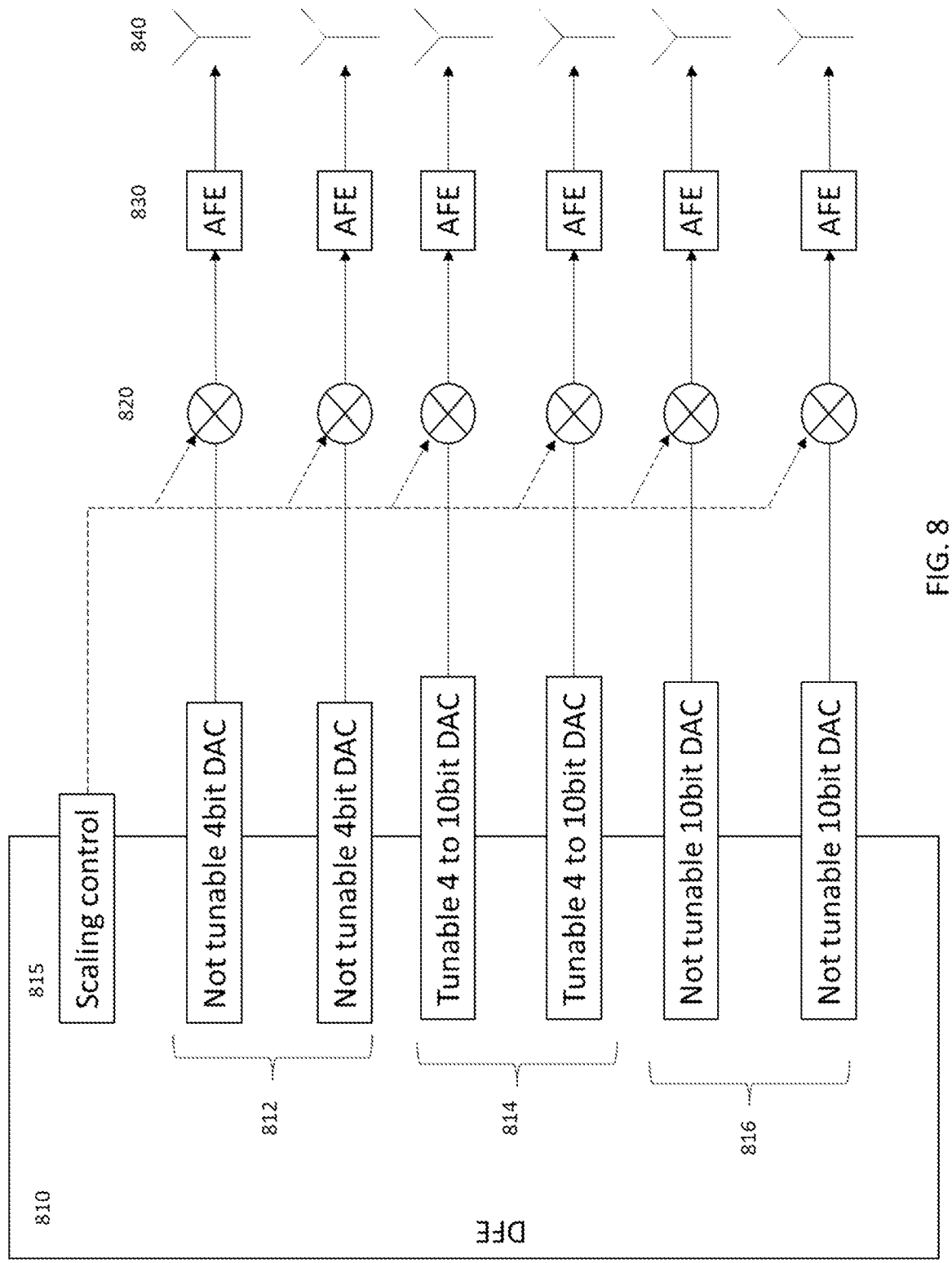
FIG. 8 illustrates an example embodiment of a multi-TRX system.

FIG. 8 illustrates an example embodiment of a multi-TRX antenna system. In this example embodiment, there is a digital frontend (DFE) 810. The DFE 810 comprises a first group of DACs 812 that have a first resolution, a second group of DACs 814 of a second resolution, which is a selectable resolution and a third group of DACs 816 with a third resolution that is greater than the first resolution. In this example embodiment, the first resolution is 4 bits, the second resolution is selectable between 4 to 10 bits and the third resolution is 10 bits. The DFE 810 also comprises a scaling control 815 that is then used to control the gain 820 applied to the signals from the DACs after which the signals are transmitted using their respective AFEs 830 and respective antennas 840. Thus, in this example embodiment, there may be a real-time DAC cell activation or deactivation applied and the real time digital or analog gain scaling may be performed according to real signal level for the DAC groups respectively. This may achieve dynamic DAC bit settings with a direct impact on RF signal full scale level capability.

Figure 9:
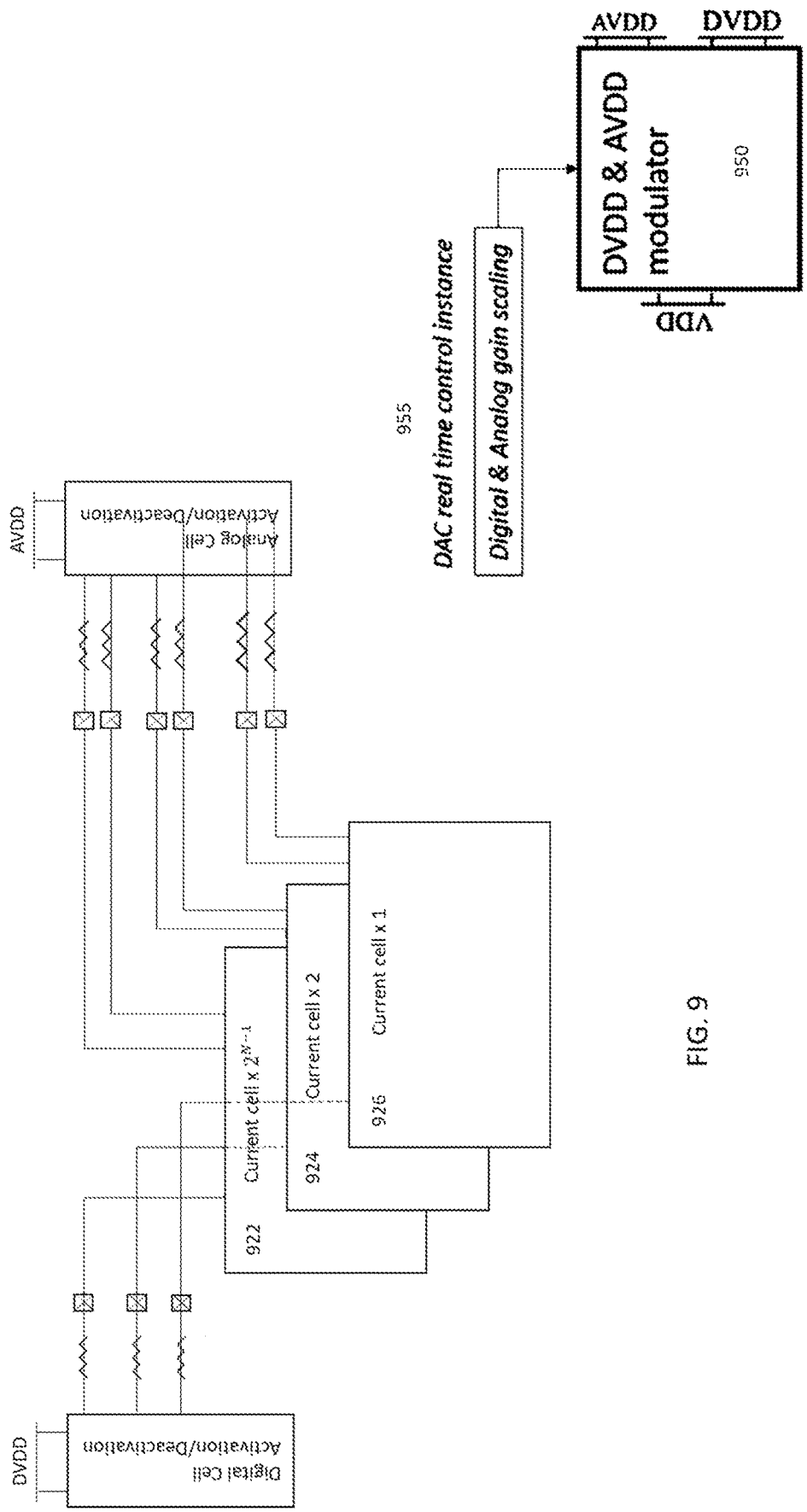
FIG. 9 illustrates an example embodiment for DAC cell selection implementation.

FIG. 9 illustrates an example embodiment for DAC cell selection implementation. In this example embodiment, there is a digital cell activation and deactivation unit 910 and an analog cell activation and deactivation unit 930. These units may be used to activate and deactivate cells 922, 924 and 926 according to selections that may vary in accordance with traffic load for example. Thus, in this example embodiment, the DAC cell selection implementation in the DAC allows to control the DAC quantization level.

In order to reduce the complexity, the DAC bit resolution may be managed at a DAC group level as an alternative to per DAC element, forming different DAC group of non tunable DAC and tunable DAC according to the RFSoC integration level and mMIMO configuration to address. In some example embodiment, settings for different groups may be configured according to digital & analog circuit requirements with minimum circuit complexity level.

FIG. 9 further illustrates a digital and analog supply voltage level selection block 955, which may allow DVDD & AVDD might be switched on/off, thus adding voltage level dynamic configuration either in continuous mode or in discrete step mode. The block 950 may be based on real time silicon body bias tuning compatible with silicon technology as SOI. In discrete mode, a look-up table (LUT) while in a continuous mode is based on polynomial law as pre-defined configurations set at design stage and manage by DAC real time controller block. The digital and analog voltage level selection block 950 may be configured using as an input a signal from a digital and analog gain scaling block 955.

Figure 10:
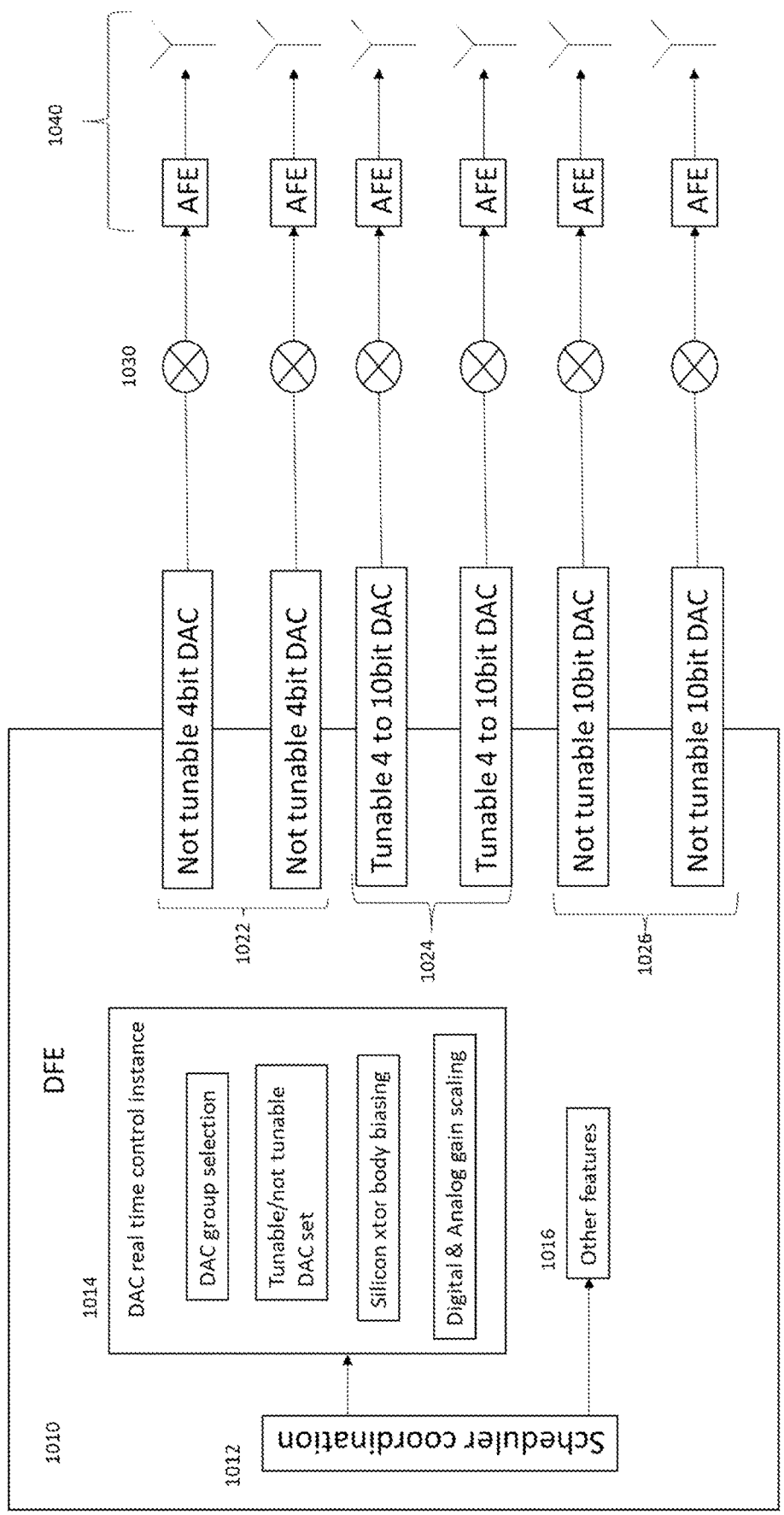
FIG. 10 illustrates an example embodiment of a digital frontend.

FIG. 10 illustrated an example embodiment of DFE 1010. In this example embodiment, the DFE 1010 comprises a first group of DACs 1022 with a first resolution, a second group of DACs 1024 with a second resolution that is selectable and a third group of DACs 1026 with a third resolution that is higher than the first resolution. Additionally, the DFE 1010 comprises a unit 1012 for scheduler coordination that then provides input to unit 1014 and to unit 1016. The unit 1014 is a DAC real time control instance and it may perform DAC group selection, determining if selectable or non-selectable DACs are to be used, performing silicon xtor body biasing and digital and analog scaling. Unit 1016 may determine other features such as discontinuous transmission (DTX) and mMIMO muting. After the DACs, gain scaling 1030 is performed and the signals are transmitted using AFEs and their respective antennas 1040. Thus, the DFE 1010 may perform activating and de-activating the TRX paths, as well as selection and application of various determined DC offset values to the individual currently active DACs, e.g. related to actual load situation, number of beams, etc. Also, the DFE 1010, in this example embodiment, performs DAC tuning for the second group of DACs 1024, in other words, selects the resolution for the second group of DACs 1024.

A highly flexible reconfigurable DAC equipped multi-TRX-antenna system, such as described above, may be utilized for different situations. For example, if there is a low load situation, when a limited number of terminal devices are to be served and thus either no beams or a low number of beams formed by limited number of antennas and/or TRX, a high resolution, such as 10 bit, DACs may be selected to be active, while the others may be deactivated in order to limit power consumption. Then, if there is a medium load situation, the DACs with the highest power-consumption may be for example de-activated, while the low resolution DACs, such as 4 bit, and DACs with selectable resolution such as from 4 to 10 bit, may be activated and configured in an coordinated manner with respect to number of active DACs of each group, optimum DAC body biasing and adequate respective DAC specific DC offsets in order to serve terminal devices in an most system energy efficient manner while still meeting performance. Further, in case there is a full load, up to all DACs may be activated with coordinated DAC body biasing and respective DAC specific DC offsets to meet performance in an most energy efficient manner. The number of actually active DACs of each group may thus be flexibly controlled over the load scenario so that actually required DACs per group are active to meet the actual required load and performance.

On top of the load use cases as described here above, the propagation model, group of users in the cell i.e. globally the scenario in space domain, may be considered as well. For example, in case of high beam selectivity, regardless of what the required beam count is, with two groups of terminal devices located in adjacent manner in azimuth and/or elevation, all TRx may be active. The level of resolution may then be defined according to an achievable SINR by digital precoding stage and targeted throughput with MCS.

Figure 11C:
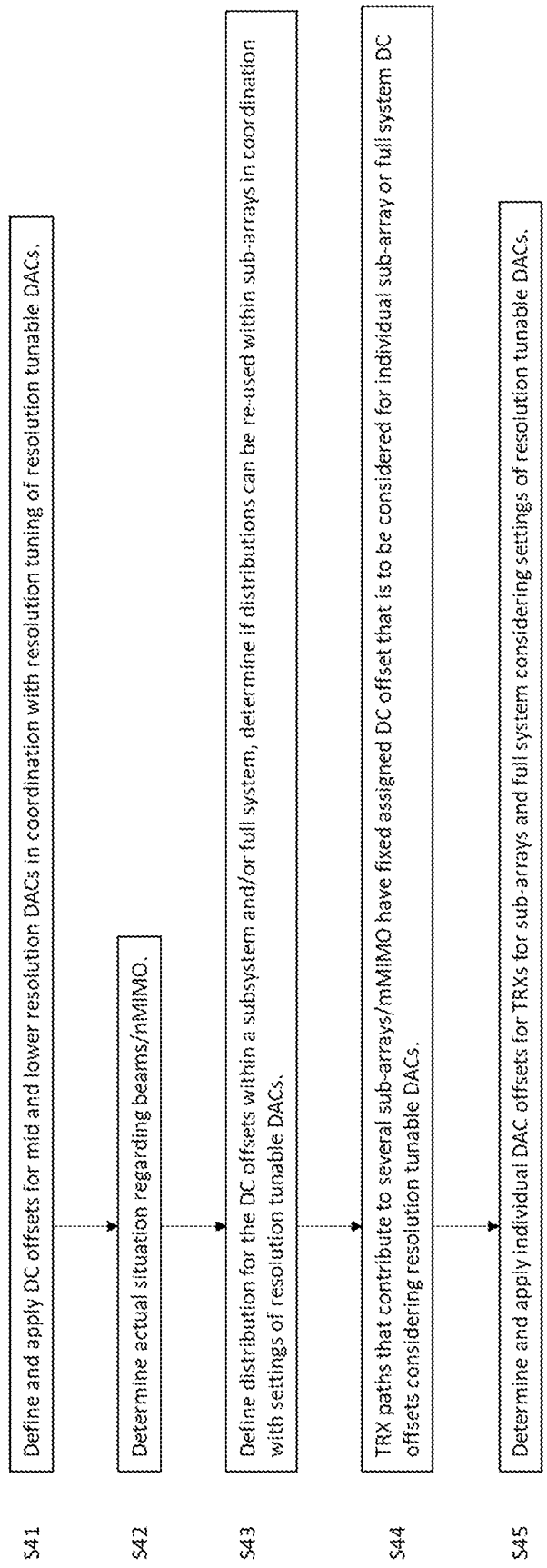

FIGS. 11A, 11B and 11C illustrate flow charts according exemplarily embodiments of operation of the described multi-TRX-antenna system with flexible DAC selection, dynamic DAC quantization optimization, analog gain optimization as well as DC offset determination, all targeting on improved energy efficient system operation while still meeting required system performance such as EVM, adjacent channel leakage ratio (ACLR), or coverage.

In FIG. 11A, in step S1, continuous monitoring of actual and forecasted load and beam and/or mMIMO situation is performed and it is determined if there is any change. If not, the monitoring continues but if yes, then the flow chart proceeds to step S2, in which provision of information regarding actual and forecasted load and beam and/or mMIMO situation is performed. Then in step S3, analysis is performed on information and an optimum resolution is determined by selecting a configuration of DACs to be activated. As well as the required body biasing required for the selected DACs and optionally also individual DC offsets to achieve overall low DAC power consumption while still meeting required performance.

Next, in step S4 the DACs are activated and deactivates according to the determined configuration. It is to be noted that the configuration may be understood as determining the group(s) of DACs to be activated/deactivated. In Step S5 then for the DACs to be activated a respective body biasing may be activated and applied. In step S6 then, the individual DC offsets may be determined and applied to the activated DACs after which the operation is started in S7 and after that, the flow chart may return to S1.

FIG. 11B then illustrates in more detail the step S4 illustrated in FIG. 11A for selecting the DACs. In this example embodiment, first in S11, the TRX paths, in other words, the DACs, to be activated based on the actual traffic load and/or degree of capacity utilization, are selected. The selection may be based on taking in to account the capabilities of DACs with selectable resolution. Then, in S12, the category of the load is determined and the category may be for example light, medium or full.

If the load is light, then in S13 TRX paths that are active are of first number, which is less than if the load is medium or full. Then, in S14, it is determined if selectable DAC resolution is beneficial and in S15 TRX paths with high resolution and optionally also with selectable resolution are selected to be activated. In S16 the identified TRX paths are then activated and in S17 the selectable resolutions are set to be in the selected resolution. In S18 then the analog gain scaling of the DACs in the TRX paths are optimized and in S19 it is determined if individual DC offsets are to be applied to the TRX paths.

In case the load is medium, then in S23 TRX paths that are active are of second number, which is less than if the load is full but less that in the load is light. Then, in S24, it is determined if selectable DAC resolution is beneficial and in S25 TRX paths with medium or low resolution and optionally also with selectable resolution are selected to be activated. In S26 the identified TRX paths are then activated and in S27 the selectable resolutions are set to be in the selected resolution. In S28 then the analog gain scaling of the DACs in the TRX paths are optimized and in S29 it is determined if individual DC offsets are to be applied to the TRX paths. For example, as the load is medium, the individual DC offsets may be applied for resolutions that are mid and low resolutions.

In case the load is high, then in S33 TRX paths that are active are of third number, which is more than if the load is medium or light. Then, in S34, it is determined if selectable DAC resolution is beneficial and in S35 TRX paths with medium or low resolution and optionally also with selectable resolution are selected to be activated as well as the high resolution TRX paths. In S36 the identified TRX paths are then activated and in S37 the selectable resolutions are set to be in the selected resolution. In S38 then the analog gain scaling of the DACs in the TRX paths are optimized and in S39 it is determined if individual DC offsets are to be applied to the TRX paths. For example, as the load is medium, the individual DC offsets may be applied for resolutions that are mid and low resolutions.

In FIG. 11C, the steps S6, S29 and S39 are illustrated in more detail. In step S41 the individual DC offsets to be applied are determined for TRX paths that are in a first and second categories in this example embodiment mid- and lower resolution categories. This may be performed in coordination with resolution selection of the DACs for which resolution may be comprised. Then, in S42, it is determined what the actual situation is in terms of beam and mMIMO. For example, the situation of sub-arrays may be determined. Then in S43, the DC offset distribution is determined, and it may be for example random or with equal steps. The DC offset distribution is determined to be optimal for within sub-array or for a full system. It is also determined if distributions can be re-used within sub-arrays in coordination with settings of selectable resolution DACs. In S44, the TRX paths that contribute to several sub-arrays, and/or mMIMO may have a fixed DC offset assigned and they may need to be considered for individual sub-array or full system DC-offset determination considering settings of selectable resolution DACs. Finally, in S45, individual DC offset may be determined and applied for TRX paths for sub-arrays and for full system by taking settings of selectable resolution DACs into account.

Figure 12:
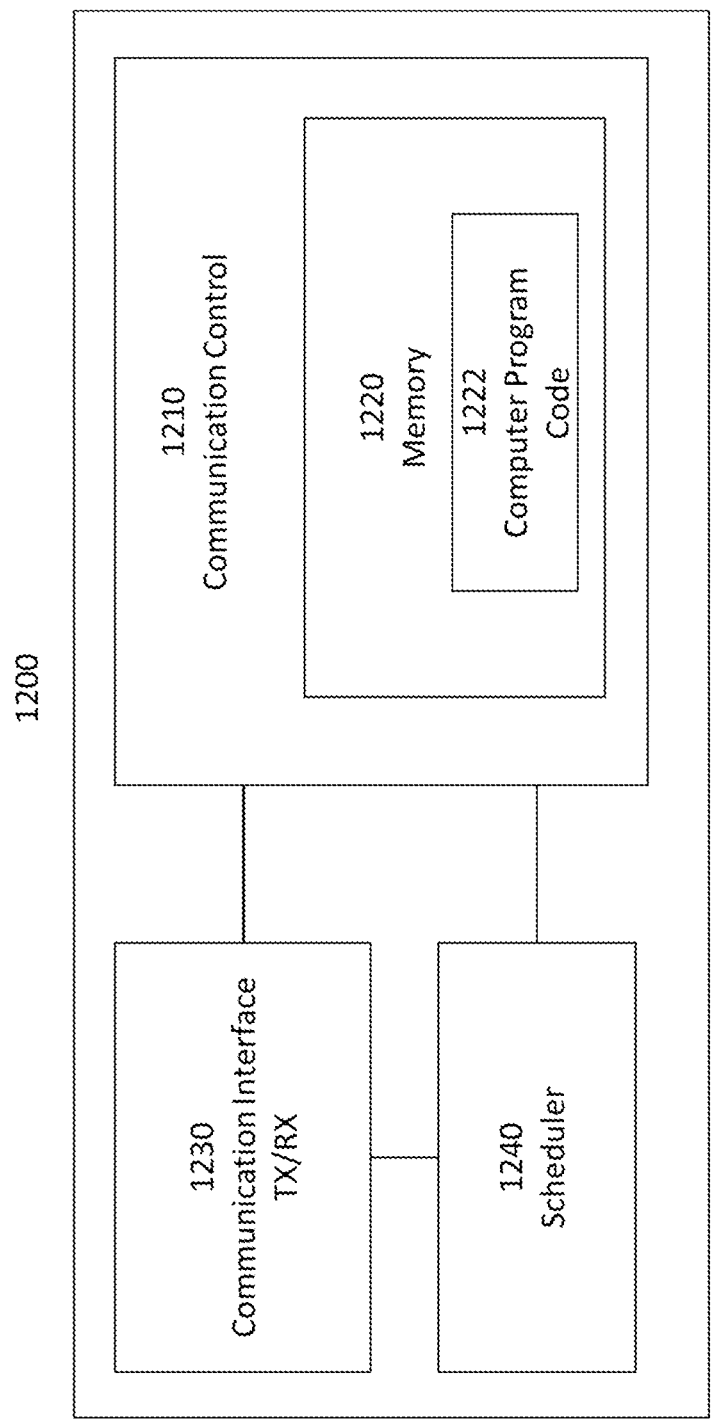
FIG. 12 illustrates an example embodiment of an apparatus.

The apparatus 1200 of FIG. 12 illustrates an example embodiment of an apparatus that may be an access node or be comprised in an access node. The apparatus may be, for example, a circuitry or a chipset applicable to an access node to realize the described embodiments. The apparatus 1200 may be an electronic device comprising one or more electronic circuitries. The apparatus 1200 may comprise a communication control circuitry 1200 such as at least one processor, and at least one memory 1220 including a computer program code (software) 1222 wherein the at least one memory and the computer program code (software) 1222 are configured, with the at least one processor, to cause the apparatus 1200 to carry out any one of the example embodiments of the access node described above.

The memory 1220 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some example embodiments, structures of the frames used in the detected neighbour cells.

The apparatus 1200 may further comprise a communication interface 1230 comprising hardware and/or software for realizing communication connectivity according to one or more communication protocols. The communication interface 1230 may provide the apparatus with radio communication capabilities to communicate in the cellular communication system. The communication interface may, for example, provide a radio interface to terminal devices. The apparatus 1200 may further comprise another interface towards a core network such as the network coordinator apparatus and/or to the access nodes of the cellular communication system. The apparatus 1200 may further comprise a scheduler 1240 that is configured to allocate resources.

Even though the invention has been described above with reference to example embodiments according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus comprising:
   at least one processor; and
   at least one memory including a computer program code, wherein the at least one memory and the computer program code are configured, with the at least one processor, to cause the apparatus to:
     determine a traffic load situation of a traffic load existing at the apparatus and determine a category for the traffic load situation;
     select, based on the category for the traffic load situation, one or more groups of digital to analog converters to be used, wherein the one or more groups of the digital to analog converters have different resolutions for digital to analog conversions;
     activate the selected one or more groups of digital to analog converters for transmitting input signals;
     configure and apply body biasing to the activated at least one group;
     convert the input signals to analog signals via the activated one or more groups of digital to analog converters; and
     transmit the analog signals using multiple antennas.

2. The apparatus according to claim 1, wherein the one or more groups of digital to analog converters comprise one or more of the following: a group with a fixed resolution and a group with a selectable resolution.

3. The apparatus according to claim 2, wherein the apparatus is further caused to, based on the traffic load situation, determine a resolution for the group with the selectable resolution.

4. The apparatus according to claim 1, wherein the traffic load situation is determined based on actual traffic load and forecasted traffic load.

5. The apparatus according to claim 1, wherein the apparatus is further caused to determine for the one or more groups of digital to analog converters their respective gain for scaling and add the determined gains before transmitting the input signals.

6. The apparatus according to claim 1, wherein the apparatus is further caused to deactivate at least one group of digital to analog converters.

7. The apparatus according to claim 1, wherein the apparatus is further caused to determine, for at least one group of digital to analog converters, direct current offsets, to add the direct current offsets before the digital to analog conversions and to remove the added direct current offsets after the digital to analog conversions.

8. A method comprising:
- determining a traffic load situation of a traffic load existing at an antenna system and determine a category for the traffic load situation;
- selecting, based on the category for the traffic load situation, one or more groups of digital to analog converters to be used, wherein the one or more groups of the digital to analog converters have different resolutions for digital to analog conversions;
- activating the selected one or more groups of digital to analog converters for transmitting input signals;
- configuring and applying body biasing to the activated at least one group;
- converting the input signals to analog signals via the activated one or more groups of digital to analog converters; and
- transmitting the analog signals using multiple antennas.

9. The method according to claim 8, wherein the method comprises determining for the one or more groups of digital to analog converters their respective gain for scaling and adding the determined gains before transmitting the input signals.

10. A computer program embodied on a non-transitory computer-readable medium, said computer program comprising instructions for causing an apparatus to perform at least the following:
- determine a traffic load situation of a traffic load existing at the apparatus and determine a category for the traffic load situation;
- select, based on the category for the traffic load situation, one or more groups of digital to analog converters to be used, wherein the one or more groups of the digital to analog converters have different resolutions for digital to analog conversions;
- activate the selected one or more groups of digital to analog converters for transmitting input signals;
- configure and apply body biasing to the activated at least one group;
- convert the input signals to analog signals via the activated one or more groups of digital to analog converters; and
- transmit the signals using multiple antennas.

\* \* \* \* \*